(12) United States Patent
Kusu

(10) Patent No.: US 8,491,029 B2
(45) Date of Patent: Jul. 23, 2013

(54) TONNEAU COVER DEVICE OF VEHICLE

(75) Inventor: Hirotaka Kusu, Hiroshima (JP)

(73) Assignee: Mazda Motor Corporation (JP)

( * ) Notice: Subject to any disclaimer, the term of this patent is extended or adjusted under 35 U.S.C. 154(b) by 84 days.

(21) Appl. No.: 13/024,116

(22) Filed: Feb. 9, 2011

(65) Prior Publication Data
US 2011/0241372 A1 Oct. 6, 2011

(30) Foreign Application Priority Data

Mar. 30, 2010 (JP) .................................. 2010-077866

(51) Int. Cl.
*B60R 5/04* (2006.01)

(52) U.S. Cl.
USPC .................................. 296/24.43; 296/37.16

(58) Field of Classification Search
USPC ............ 296/24.43, 24.44, 24.45, 37.5, 37.16, 296/100.15; 160/DIG. 2
See application file for complete search history.

(56) References Cited

U.S. PATENT DOCUMENTS

| | | | |
|---|---|---|---|
| 3,181,911 A * | 5/1965 | Peras | 296/37.1 |
| 4,202,578 A * | 5/1980 | Roullier et al. | 296/37.16 |
| 4,489,660 A * | 12/1984 | Tamamushi | 108/44 |
| 7,641,256 B2 * | 1/2010 | Kodaira et al. | 296/37.16 |
| 7,673,921 B2 * | 3/2010 | Hirayama et al. | 296/37.16 |
| 8,011,711 B2 * | 9/2011 | Hirayama et al. | 296/24.43 |

FOREIGN PATENT DOCUMENTS

| | | | |
|---|---|---|---|
| JP | 39-016961 | | 8/1964 |
| JP | 55008931 A | * | 1/1980 |
| JP | 57205222 | * | 12/1982 |

* cited by examiner

*Primary Examiner* — Charles A. Fox
*Assistant Examiner* — E Turner Hicks
(74) *Attorney, Agent, or Firm* — Studebaker & Brackett PC

(57) ABSTRACT

A tonneau cover device of a vehicle equipped with a rear opening portion formed at a rear portion of a vehicle body, a back door to open and close the rear opening portion, and a rear baggage compartment formed in front of the rear opening portion, comprises a tonneau board provided so as to extend substantially horizontally over the rear baggage compartment, the tonneau board comprising plural split boards which are split in a vehicle longitudinal direction, longitudinally-adjacent split boards being coupled to each other via a hinge portion extending in a vehicle width direction, and first and second connecting members as a folding mechanism pulling upwardly the split boards when the back door is opened so that the split boards bend around the hinge portion.

5 Claims, 11 Drawing Sheets

TONNEAU COVER DEVICE OF VEHICLE

BACKGROUND OF THE INVENTION

The present invention relates to a tonneau cover device of a vehicle which comprises a rear opening portion formed at a rear portion of a vehicle body, a back door to open and close the rear opening portion, a rear baggage compartment formed in front of the rear opening portion, and a tonneau board provided so as to extend substantially horizontally over the rear baggage compartment.

Conventionally, an automotive vehicle equipped with a back door (tail gate) disclosed in Japanese Patent No. 39-16961 is known. Herein, a rear baggage compartment is partitioned into two baggage spaces, an upper space and a lower space, by a front-side panel fixed to a seatback of a rear seat and a rear-side panel arranged in back of the front-side panel, and an automatic support device equipped with a pair of arms operating to pull up a rear end portion of the rear-side panel when the back door is opened is provided so that a rear upper face of the above-described lower space can be opened so as to provide an easy baggage's bringing in or out of the lower space of the baggage compartment.

In case the rear-side panel with a specified width which covers an upper rear portion of the rear baggage compartment is pulled up in accordance with the opening operation of the back door as disclosed in the above-described publication, it may be necessary to design so that the rear end portion of the rear-side panel does not contact a side face or an upper end portion of the rear baggage compartment. Accordingly, there were problems in that the size of the rear-side panel or its movable range were restricted, the kind of vehicles to which the above-described structure is applicable were limited, and so on.

That is, the normal vehicles generally have a vehicle-body shape in which an upper portion of the vehicle body becomes narrower in a back view and a rear portion of the vehicle body becomes narrower in a plan view. Therefore, if the width of the rear panel is set at a specified value which corresponds to the width of the rear baggage compartment, there is a problem in that in case the rear end portion of the rear-side panel is pulled up in accordance with the opening operation of the back door, the rear end portion would easily interfere with the upper portion of the side face of the rear baggage compartment with the narrow width. Thus, there were problems in that in order to prevent this, the size of the rear-side panel or its movable range would be restricted, or the kind of vehicles to which the above-described structure is applicable would be limited to a particular vehicle, such as a so-called station wagon type of vehicle having a box shape of the rear vehicle body.

SUMMARY OF THE INVENTION

The present invention has been devised in view of the above-described problems, and an object of the present invention is to provide a tonneau cover device of a vehicle which can make the baggage's bringing in or out easier.

According to the present invention, there is provided a tonneau cover device of a vehicle which comprises a rear opening portion formed at a rear portion of a vehicle body, a back door to open and close the rear opening portion, and a rear baggage compartment formed in front of the rear opening portion, comprising a tonneau board provided so as to extend substantially horizontally over the rear baggage compartment, the tonneau board comprising plural split boards which are split in a vehicle longitudinal direction, longitudinally-adjacent split boards being coupled to each other via a hinge portion extending in a vehicle width direction, and a folding mechanism pulling upwardly the split boards when the back door is opened so that the split boards bend around the hinge portion.

According to the present invention, the rear portion of the rear baggage compartment can be opened widely so as to make the baggage's bringing in or out of the rear baggage compartment easier, by moving the split boards and shortening the longitudinal length of the split boards, preventing the rear end portion of the split boards from interfering with the upper portion of the side face of the rear baggage compartment with the narrow width, when the back door is opened.

According to an embodiment of the present invention, the split boards comprise a front board provided on a front side of the vehicle, a rear board provided on the rear side of the vehicle, and a middle board provided between the front board and the rear board, the front board and the middle board are coupled to each other via a first hinge portion, the middle board and the rear board are coupled to each other via a second hinge portion, the folding mechanism pulls upwardly the front board and the rear board when the back door is opened, and there is provided a forward move mechanism which moves the split boards forwardly from an initial position of the split boards by pulling forwardly the middle board in accordance with a folding move of the split boards. Thereby, the opening area of the rear baggage compartment can be enlarged effectively by automatically moving the middle board forwardly from its initial position by using a reaction function of the split boards pulled upwardly and moving to the folding state and also by moving the rear board forwardly in accordance with this.

According to another embodiment of the present invention, the folding mechanism has the split boards folded by making respective upper or back faces of the plural split boards approach each other. Thereby, the above-described split boards can be made properly compact with a simple structure, so that the storage of the baggage into the rear baggage compartment can be improved effectively.

According to another embodiment of the present invention, the folding mechanism pulls upwardly a split board positioned on a rear side of the vehicle in advance of another split board positioned in front of the split board positioned on the rear side of the vehicle. Thereby, the split board on the rear side can be pulled upwardly smoothly with a lighter force, without influencing with the other board improperly.

According to another embodiment of the present invention, the tonneau board comprises a fixed board fixed to the vehicle body so as to extend substantially horizontally in front of the split boards. Thereby, the folding operation of the split boards can be facilitated by properly restraining the weight increase of the split boards bent with the folding mechanism, securing the sufficient longitudinal whole length of the tonneau board by covering the whole rear baggage compartment with the tonneau board comprised of the fixed board and the split boards.

According to another embodiment of the present invention, the split boards have a substantially-equal longitudinal width, and are detachable from the vehicle body. Thereby, the tonneau board can be easily stored by being folded compactly.

According to another embodiment of the present invention, the hinge portion includes a biasing means to bias the split boards so that the split boards return to a substantially-horizontally-extending initial state thereof when the back door is closed. Thereby, when the back door is closed, the tonneau board can be positioned in its substantially-horizontally extending state over the rear baggage compartment, without any troublesome operation, such as a manual operation for expanding the tonneau board.

According to another embodiment of the present invention, the split boards comprise a front board provided on a front side of the vehicle and a rear board provided on the rear side of the vehicle, the front board and the rear board are coupled to each other via the hinge portion, the folding mechanism pulls upwardly a rear end portion of the rear board when the back door is opened, and there is provided a forward move mechanism which moves a connection portion of the front board and the rear board forwardly substantially horizontally with an actuator when the back door is opened. Thereby, since the connection portion of the front board and the rear board is moved forwardly substantially horizontally by the actuator, it can be prevented effectively that the connection portion contacts an upper face of any article stored in the rear baggage compartment below the tonneau board and thereby the article hurts.

Other features, aspects, and advantages of the present invention will become apparent from the following description which refers to the accompanying drawings.

DETAILED DESCRIPTION OF THE INVENTION

Figure 1:
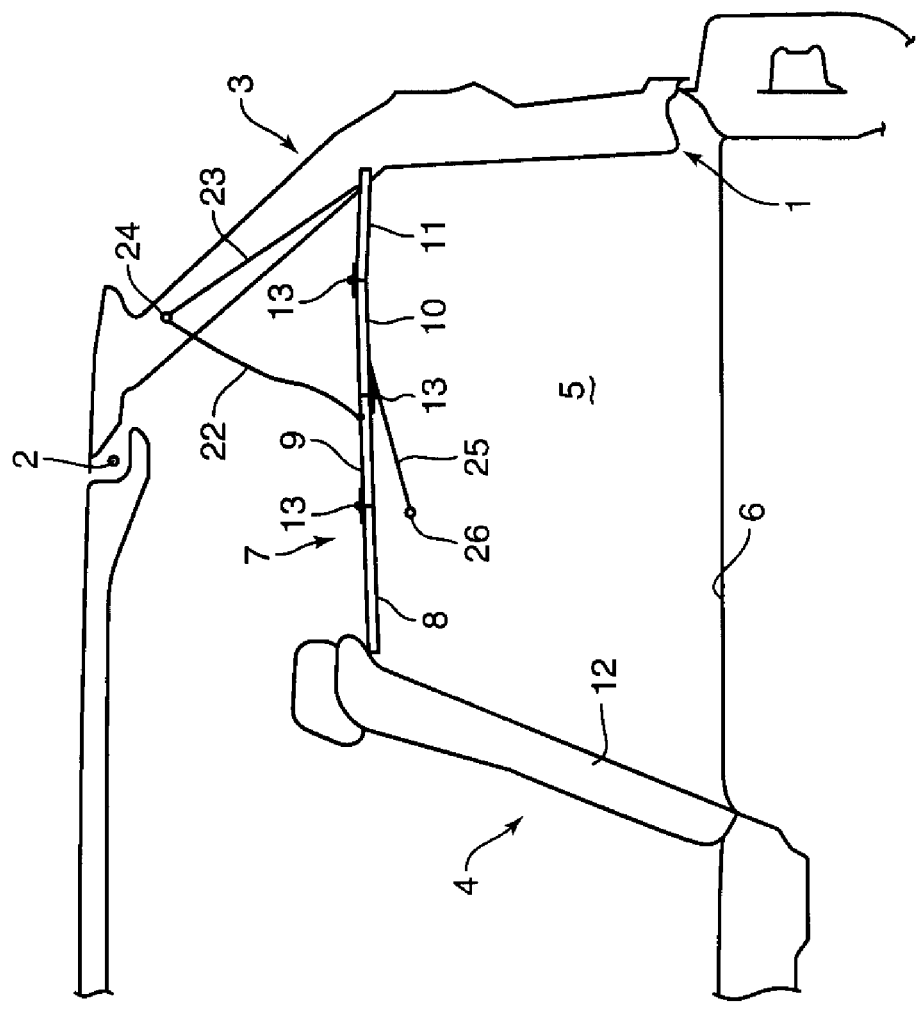
FIG. 1 is an explanatory diagram showing a first embodiment of a tonneau cover device of a vehicle according to the present invention.
Figure 2:
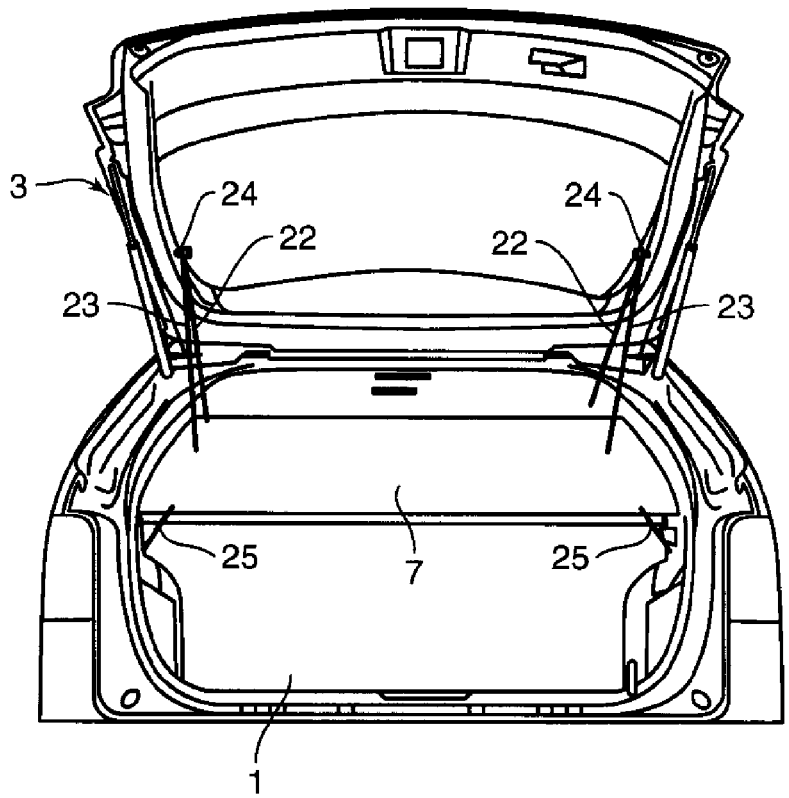
FIG. 2 is a back view showing a state in which a back door is opened.
Figure 3:
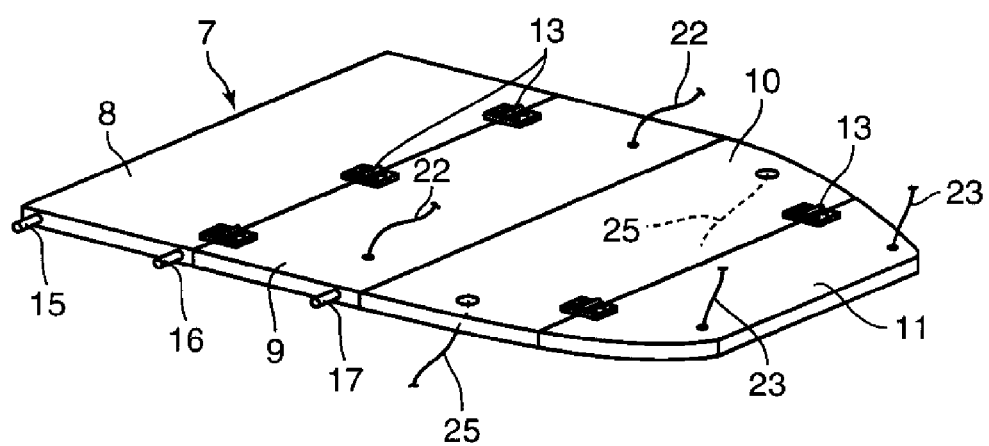
FIG. 3 is a perspective view showing a specific structure of a tonneau board.

Hereinafter, preferred embodiments of the present invention will be descried referring to the accompanying drawings.

Embodiment 1

FIGS. 1-4 show a first embodiment of a tonneau cover device of a vehicle according to the present invention. This vehicle comprises a rear opening portion 1 which is formed at a rear portion of the vehicle body, a back door 3 which swings around an upper-end pivotal portion 2 to open and close the rear opening portion 1, and a rear baggage compartment 5 which is formed between the rear opening portion 1 and a rear-row seat 4. A tonneau board 7 extends substantially horizontally above a floor panel 6 which forms a bottom portion of the rear baggage compartment 5.

The tonneau board 7 comprises three movable boards which are split in a vehicle longitudinal direction, i.e., a front board 9 which is arranged on a front side of the vehicle, a rear board 11 which is arranged on a rear side of the vehicle, and a middle board 10 which is arranged between the front board 9 and the rear board 11. In front of the front board 9 is arranged a fixed board 8 which is fixed to the vehicle body. The fixed board 8 and the split boards 9-11 have a substantially-equal longitudinal width.

Figure 4:
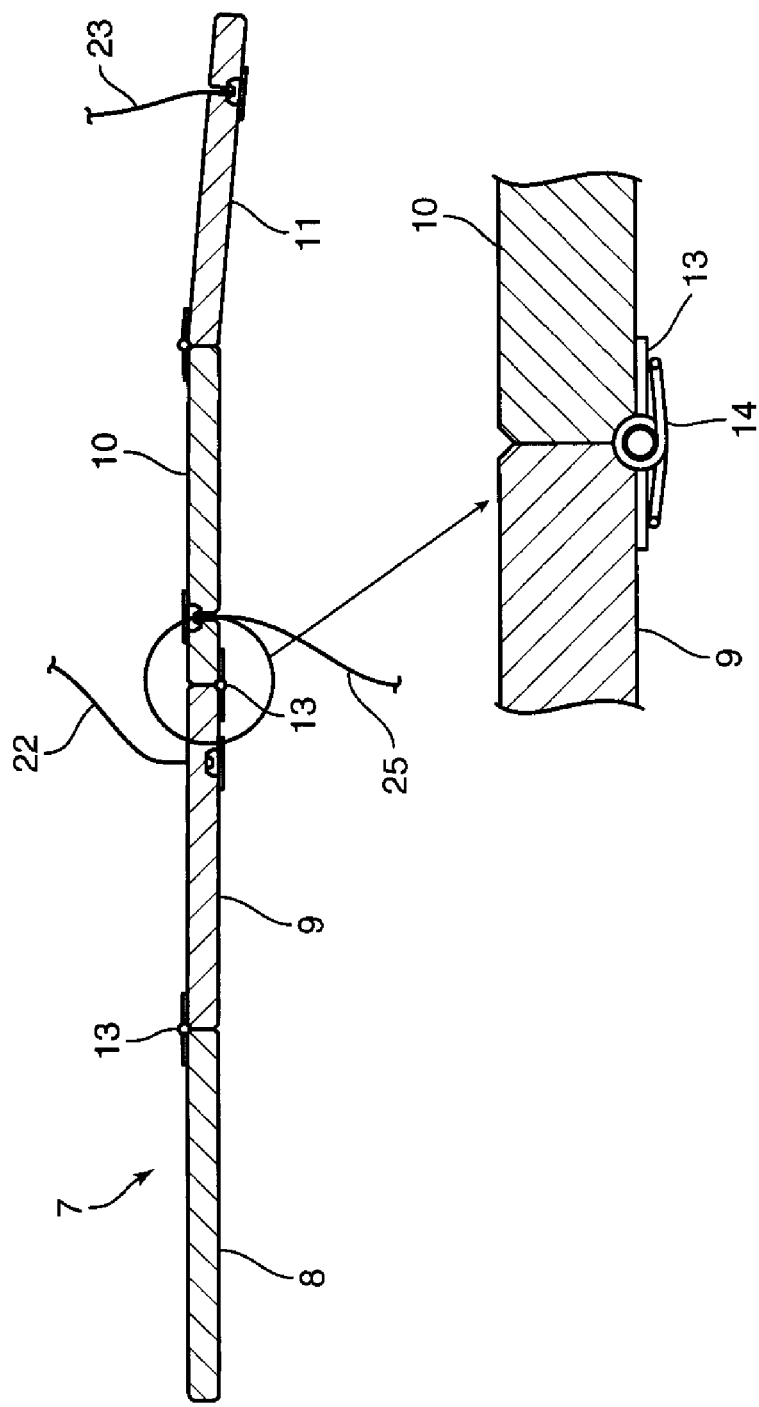
FIG. 4 is a side sectional view showing the specific structure of the tonneau board.

Adjacent boards of the fixed board 8 and the split boards 9-11 are coupled to each other via hinge portions 13 as shown in FIG. 4. The hinge portion 13 includes a basing means 14, such as a torsion coil spring, which biases the split boards 9-11 toward their substantially-horizontal initial state. When the back door 3 is closed, the fixed board 8 and the split boards 9-11 are held in a state in which their end faces contact each other in accordance with the biasing force of the biasing means 14. Accordingly, the fixed board 8 and the split boards 9-11 extend straightly so as to cover over the rear baggage compartment 5.

Figure 5:
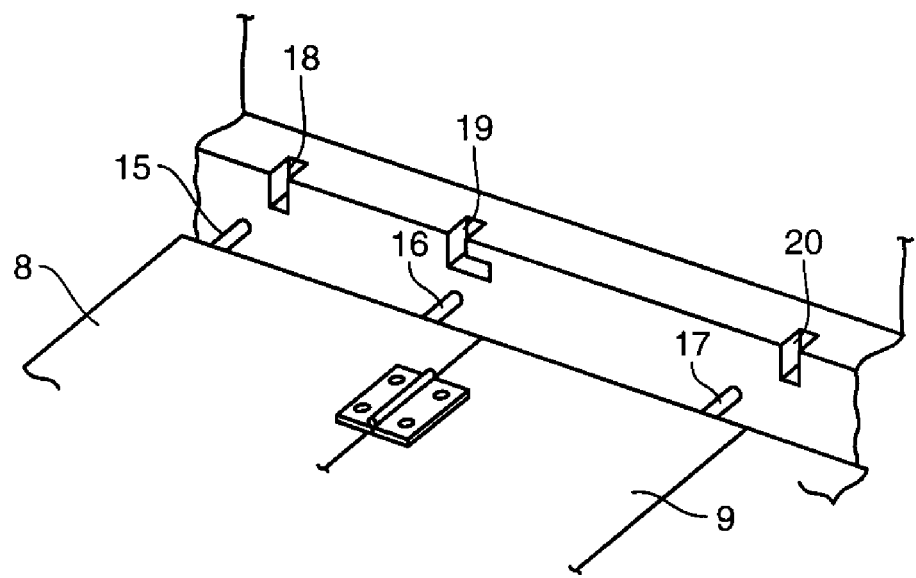
FIG. 5 is a perspective view showing a support structure of a fixed board.
Figure 6:
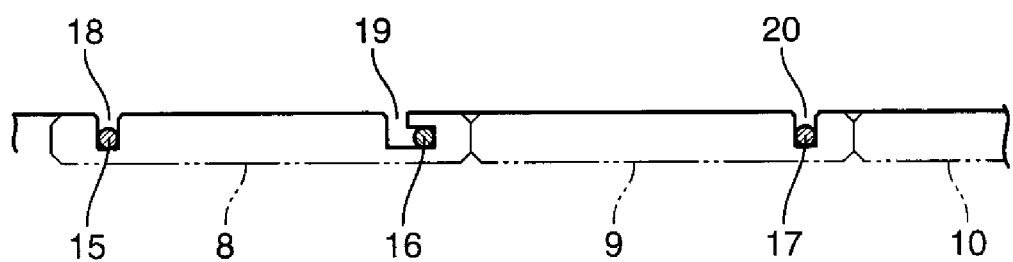
FIG. 6 is an explanatory diagram showing an arrangement state of the fixed board.

The fixed board 8 has a pair of engaging pins 15, 16 which projects outwardly, in the vehicle width direction, from its both-side end faces. The front board 9 has engaging pins 17 which project outwardly from rear portions of its both-side end faces. As shown in FIGS. 5 and 6, at both-side wall portions of the rear baggage compartment 5 behind a seatback 12 of the rear-row seat 4 are provided I-shaped first engagement grooves 18 which extend vertically, L-shaped second engagement grooves 19 which extend vertically and rearwardly, and I-shaped third engagement grooves 20 which extend vertically at specified intervals corresponding to arrangement distances of the engaging pins 15-17.

The engaging pins 16 on the rear side of the fixed board 8 are inserted into the second engagement grooves 19, while the engaging pins 15 on the front side of the fixed board 8 are inserted into the first engagement grooves 18. Thereby, the fixed board 8 is restrained longitudinally and vertically so as to extend substantially horizontally. Herein, the fixed board 8 is detachable by removing their pins 15, 16 from the above-described grooves 18, 19, respectively.

Meanwhile, the front board 9 is supported at the vehicle body via its engaging pins 17 inserted into the third engagement grooves 20 formed at the side wall portions of the rear baggage compartment 5. Further, support portions (not illustrated) project from the side wall portions of the rear baggage compartment 5, at which the middle board 10 and the rear boards 11 are supported.

Engaging pins 24 project at both side portions of the back door 3, and respective upper end portions of first and second connecting members 22, 23, which are comprised of a flexible line member, such as a wire, are detachably engaged with these pins 24. Tip portions of the first connecting members 22 are engaged with both sides of a rear portion of the front board 9. Thereby, when the back door 3 is opened, an opening force is transmitted to the front board 9 via the first connecting members 22 so that its rear end portion can be pulled obliquely rearwardly.

Lower end portions of the second connecting members 23 are engaged with both sides of a rear portion of the rear board 11. When the back door 3 is opened, the opening force is transmitted to the rear board 11 so that its rear end portion can be pulled obliquely forwardly. These first and second connecting members 22, 23 constitute a folding mechanism which pulls upwardly the split boards 9-11, respectively, in accordance with an opening operation of the back door 3, which will be described later, so that the split boards 9-11 bend around the above-described hinge portions 13 and move to their folding state.

The second connecting member 23 has a length which is almost equal to a distance between the position of the engaging pin 24 at the back door 3 and the rear portion of the rear board 11 or slightly longer than this distance (by 0.5 cm, for example). Meanwhile, the first connecting member 22 has a length which is a specified value being longer than a distance between the position of the engaging pin 24 at the back door 3 and the rear portion of the front board 9 (by 2 cm, for example). Thereby, in an initial stage when the back door 3 starts opening, the first connecting members 22 have its looseness state so that the rear board 11 positioned on the rear side of the vehicle is pulled upwardly in advance of the front board 9.

At the side wall portions of the rear baggage compartment 5 are provided engaging pins 26, with which respective lower end portions of third connecting members 25 are engaged. Upper end portions of the third connecting members 25 are engaged with side portions of a front portion of the middle board 10. The third connecting member 25 has a length which is almost equal to a distance from the engaging pin 26 at the side wall portion of the rear baggage compartment 5 to the side portion of the middle board 10 or slightly longer than this distance (by 0.5 cm, for example).

The first and third connecting members 22, 25 constitute a forward moving mechanism, which moves the middle board 10 and the others forwardly from their initial position by making the front board 9 and the middle board 10 bend in a reverse-V shape with the upward move of the rear end portion of the front board 9 via the first connecting members 22 in a state in which the side portion of the middle board 10 is pulled obliquely downwardly by the third connecting members 25 and thereby the rear end portion of the middle board 10 is restrained when the back door 3 is opened as described later.

Figure 7:
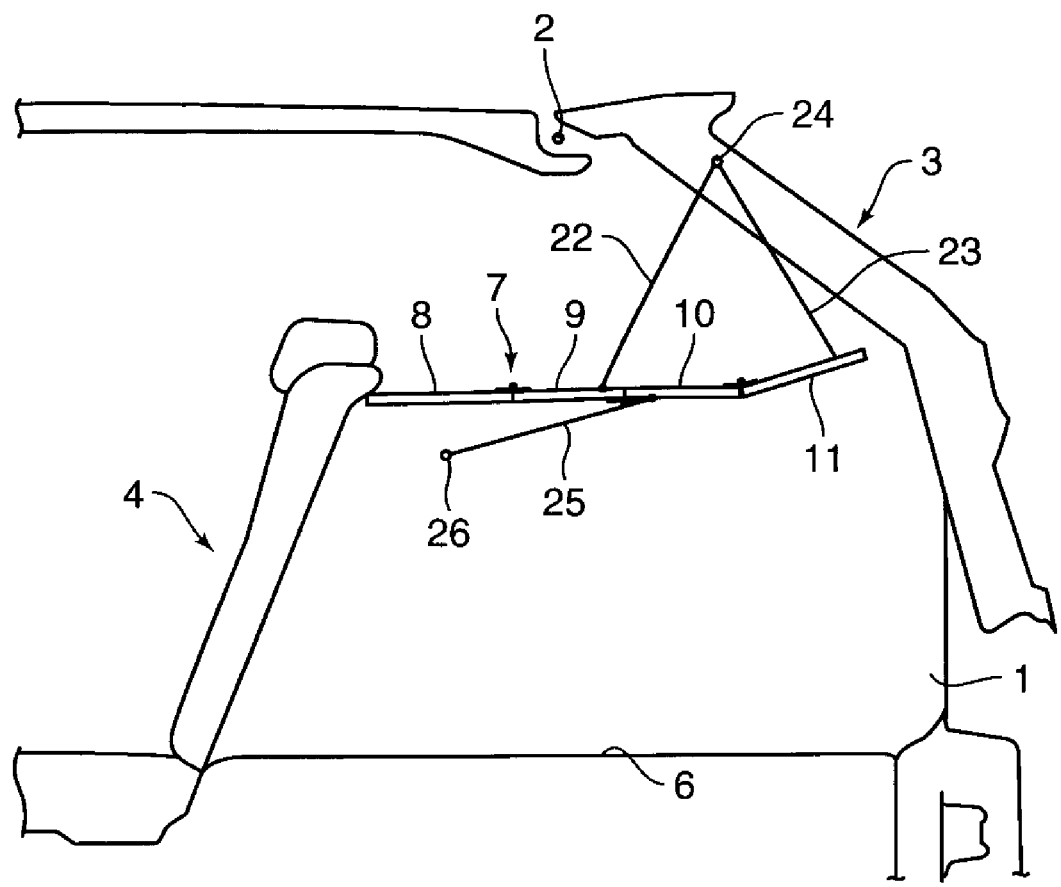
FIG. 7 is an explanatory diagram showing an opening start state of the back door.

In the structure described above, when the back door 3 is closed, the rear baggage compartment 5 is covered with the tonneau board 7 with the specified length which is comprised of the fixed board 8 and the split boards 9-11 and extends substantially horizontally in accordance with the biasing force of the biasing means 14. When the opening operation of the back door 3 is started from this state, the both sides of the rear portion of the rear board 11 are pulled upwardly by the second connecting members 23 in a state in which the both side portions of the middle board 10 of the tonneau board 7 are pulled downwardly by the third connecting members 25. Consequently, the rear board 11 bends around the front hinge portion 13 against the biasing force of the biasing means 14 as shown in FIG. 7, so that the rear end portion of the rear board 11 is pulled upwardly.

Figure 8:
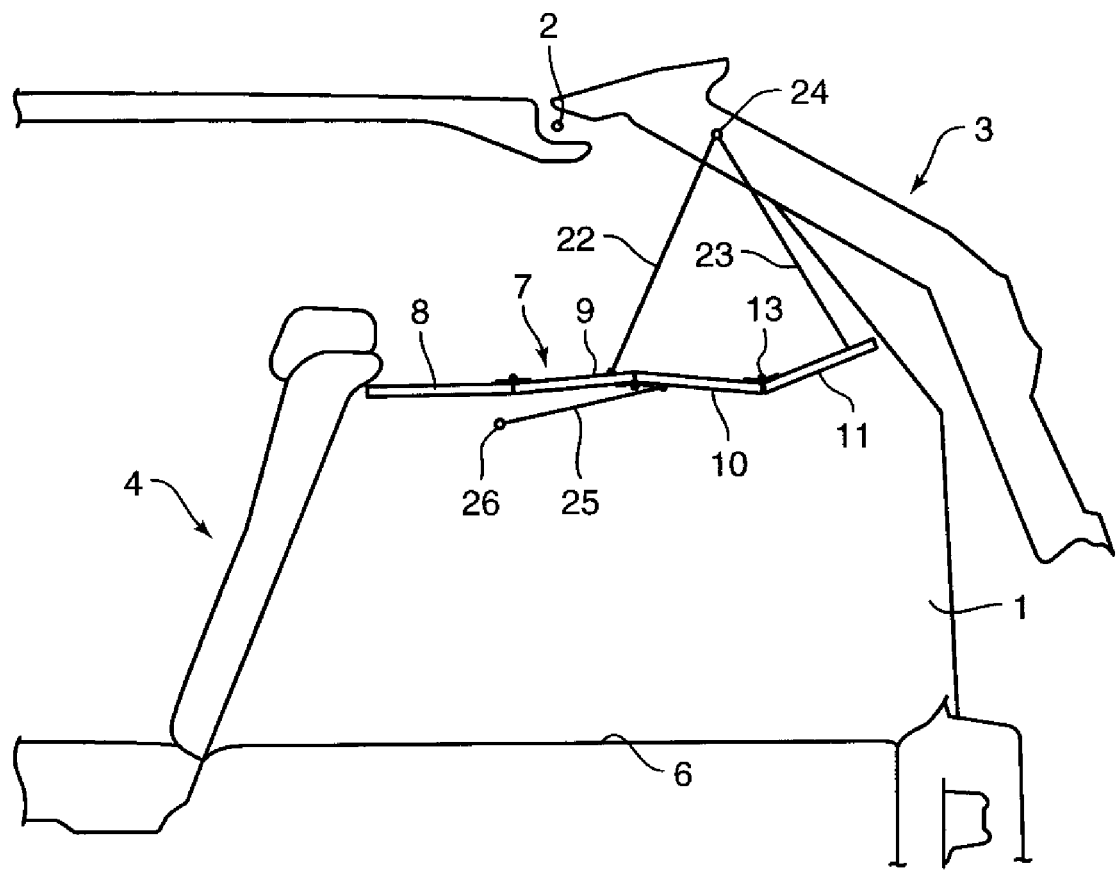
FIG. 8 is an explanatory diagram showing an opening process of the back door.

Then, when the opening angle of the back door 3 increases in accordance with the opening operation, as shown in FIG. 8, the rear board 11 and the middle board 10 bend in a V shape with the further upward pulling of the both sides of the rear portion of the rear board 11 via the second connecting members 23 in a state in which the side portion of the middle board 10 is pulled obliquely downwardly by the second connecting members 23. Further, when the looseness state of the first connecting members 22 terminates, the both sides of the rear portion of the front board 9 are pulled upwardly by the first connecting members 22 and thereby the front board 9 and the middle board 10 start bending in the reverse-V shape.

Figure 9:
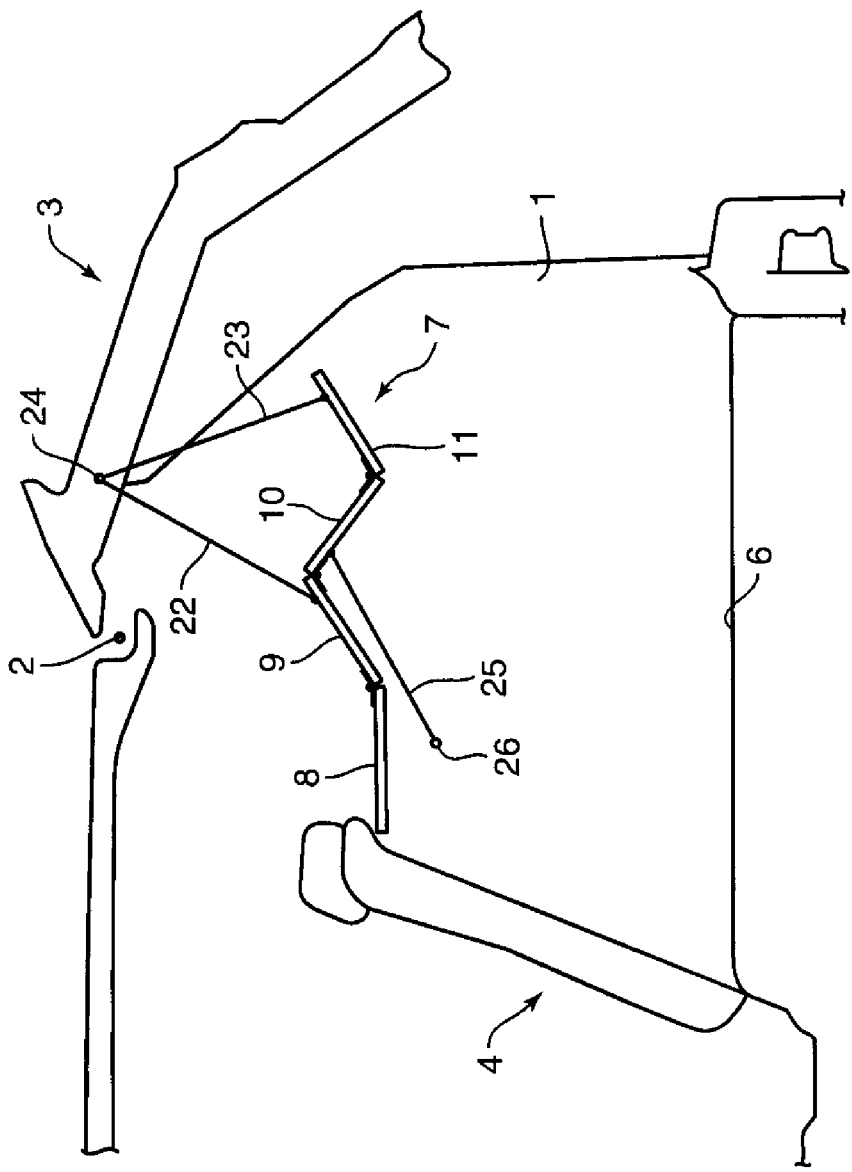
FIG. 9 is an explanatory diagram showing the opening process of the back door.

When the opening of the back door 3 becomes greater, as shown in FIG. 9, the both sides of the rear portions of the front board 9 and the rear board 11 are further pulled upwardly by the first and second connecting members 22, 23 in a state in which the both side portions of the middle board 10 are supported by the third connecting members 25, and thereby the bending angle of these boards 9, 11 increases. Thus, the front board 9 and the middle board 10 bend in the reverse-V shape with a sharper angle, so that the middle board 10 slides forwardly. Further, the middle board 10 and the rear board 11 bend in the V shape with a sharper angle, so that a connection portion between the boards 10, 11 slides forwardly substantially horizontally.

Figure 10:
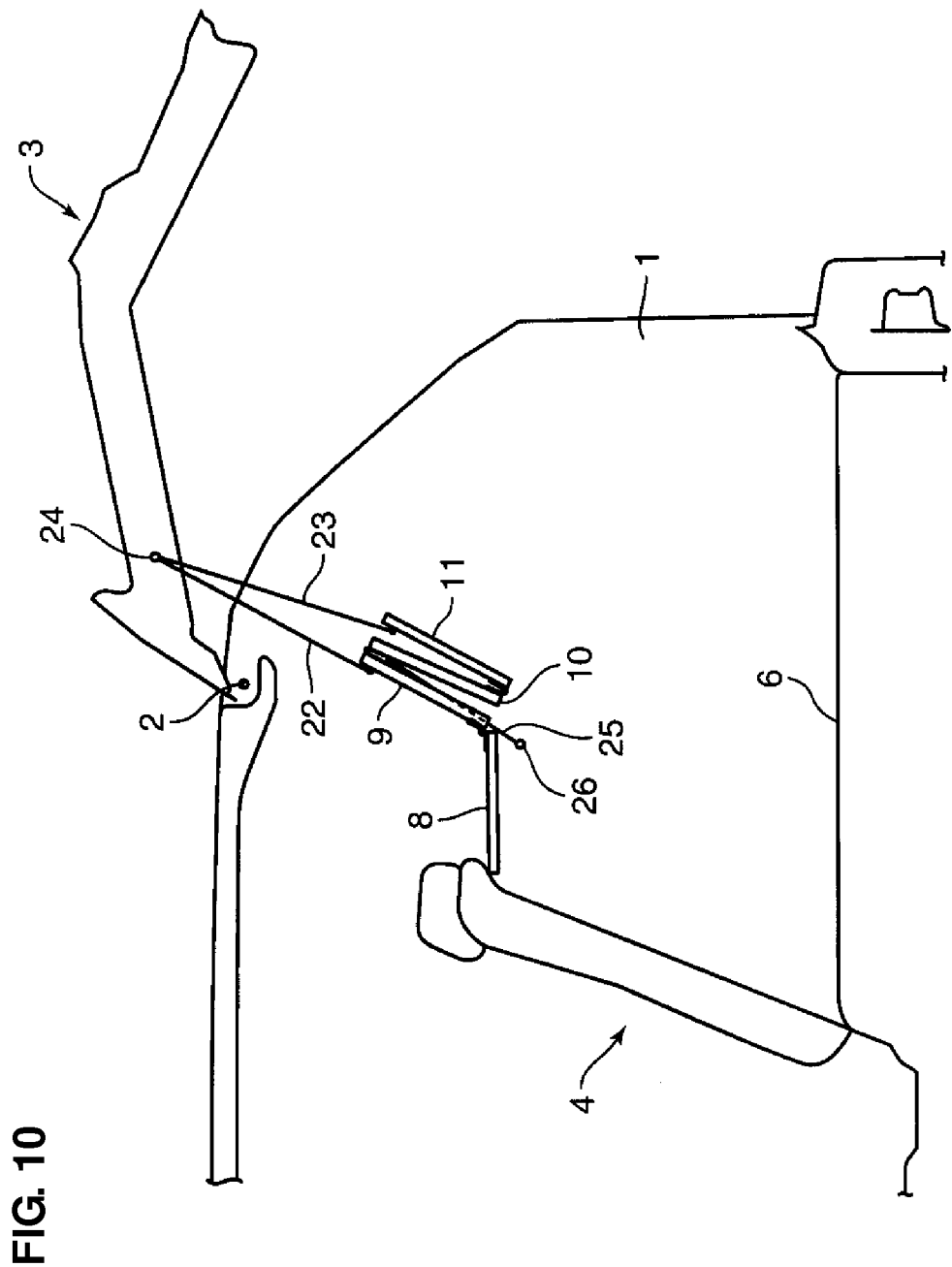
FIG. 10 is an explanatory diagram showing an opening state of the back door.

In a full open state of the back door 3 shown in FIG. 10, respective back (lower) faces of the front board 9 and the middle board 10 approach each other, and respective upper faces of the middle board 10 and the rear board 11 approach each other. Consequently, the movable boards of the split boards 9-11 fold in a bellows shape. As a result, the rear end portion of the rear board 11 rises and moves forwardly greatly, so that the upper rear portion of the rear baggage compartment 5 opens widely.

According to the present embodiment described above, the tonneau cover device of the vehicle, which comprises the rear opening portion 1 formed at the rear portion of the vehicle body, the back door 3 to open and close the rear opening portion 1, and the rear baggage compartment 5 formed in front of the rear opening portion 1, comprises the tonneau board 7 provided so as to extend substantially horizontally over the rear baggage compartment 5, the tonneau board 7 comprising the plural split boards 9-11 which are split in the vehicle longitudinal direction, the longitudinally-adjacent split boards 9-11 being coupled to each other via the hinge portions 13 extending in the vehicle width direction, and the folding mechanism pulling upwardly the split boards 9-11 when the back door 3 is opened so that the split boards 9-11 bend around the hinge portions 13 and move to their folding state. Accordingly, the rear portion of the rear baggage compartment 5 can be opened widely so as to make the baggage's bringing in or out of the rear baggage compartment 5 easier with a simple structure, when the back door 3 is opened.

That is, there are provided the first and second connecting members 22, 23 which are comprised of the flexible line member, such as a wire, and connect the both side portions of the back door 3 to the both sides of the rear portions of the front board 9 and the rear board 11, and the split boards 9-11 are pulled upwardly by the folding mechanism of the first and second connecting members 22, 23 in accordance with an opening operation of the back door 3, so that these split boards 9-11 are bent around the hinge portions 13 so as to move their folding state. Accordingly, the rear portion of the rear baggage compartment 5 can be opened widely in a state where the longitudinal length of the split boards 9-11 is shortened, preventing the rear end portion of the split boards 9-11 from interfering with the upper portion of the side face of the rear baggage compartment 5 with the narrow width.

Accordingly, the baggage's bringing in or out of the rear baggage compartment 5 can be made easier with a simple structure by opening the rear portion of the rear baggage compartment 5 widely thorough the automatically moving the split boards 9-11 upwardly and forwardly in accordance with the opening of the back door 3, avoiding any problem in that the width or the movable range of the split boards 9-11 would be improperly restricted or the kind of vehicles to which the above-described structure is applicable would be improperly limited to a particular vehicle, such as a so-called station wagon type of vehicle having a box shape of the rear vehicle body.

Further, in the present embodiment, the upward or rearward moves of the middle board 10 are restricted by pulling the side portions of the middle board 10 obliquely forwardly and downwardly and the middle board 10 is moved forwardly from its initial position when the back door 3 is opened by means of the forward moving mechanism which is comprised of the first connecting members 22 and the third connecting members 25 comprised of the flexible line member, such as a wire, and connecting the side wall portions of the rear baggage compartment 5 to the both side portions of the lower face of the middle board 10.

That is, since when the back door 3 is opened, the middle board 10 is supported by the third connecting member 25 and the rear end portion of the front board 9 is pulled upwardly by the first connecting members 22 so that the front board 9 and the middle board 10 move to their reverse-V-shape bending state, its reaction function can force the middle board 10 to move forwardly from its initial state. Further, the rear board 11 can be also moved forwardly accordingly. As a result, the opening area of the rear compartment 5 can be enlarged easily and effectively.

Herein, in place of the first and second connecting members 22, 25 comprised of the wire, an actuator to drive the middle board 10 and the others of the tonneau cover 7 forwardly may be provided so that the middle board 10 can be moved forwardly from its initial position through a drive operation of this actuator when the back door 3 is opened. However, in case the middle board 10 is pulled forwardly in accordance with the folding move of the split boards 9-11 by the folding mechanism and the split boards 9-11 are moved forwardly by the third connecting member 25 as described above, the opening area of the rear compartment 5 can be enlarged by moving the rear board 11 forwardly with a simple structure.

Instead of the above-described embodiment in which the split boards 9-11 are pulled upwardly around the hinge portions 13 in accordance with the opening operation of the back door 3 by the folding mechanism comprised of the first and second connecting members 22, 23 so that their upper face or back faces approach each other and thereby they are folded in the bellows shape, it may be considered that the split boards 9-11 are folded in a roll shape or any other shape. In these cases, however, it may not be avoided that the structure becomes improperly complex or the like. According to the above-described embodiment, however, the properly compact structure can be achieved, so that the baggage's bringing in or out of the rear baggage compartment 5 can be improved effectively.

Moreover, since the folding mechanism comprised of the first and second connecting members 22, 23 pulls upwardly the rear board 11 in advance of the front board 9 positioned in front of this rear board 11 in the above-described embodiment, the folding operation of the split boards 9-11 can be made easier. That is, if it is configured that the front board 9 is pulled upwardly in advance of the rear board 11, it may be necessary that the rear board 11 held in its substantially horizontal state is moved forwardly concurrently when the front board 9 is pulled upwardly for its bending, so that a rather large drive force may be necessary.

In the case of the above-described embodiment, meanwhile, since the rear board 11 is pulled upwardly in advance of the front board 9, only this rear board 11 can be pulled upwardly smoothly with a lighter force, without influencing the other boards improperly. Further, when the front board 9 is pulled upwardly, the rear board 11 has been already bent so as to be away from the support portion provided at the side wall of the rear baggage compartment 5. Accordingly, the front board 9 can be made bend smoothly without requiring such a rather large drive force.

Herein, another folding mechanism to move the split boards 9-11 to their folding state by using a link mechanism or rods may be applied in place of the above-described first and third mechanisms 22, 25. In the case of using the rods, however, it may be difficult to make the rods bend when the back door 3 is operated for opening or closing, so that there is a problem in that its attachment position and its length may be limited. Meanwhile, in the case of using the link mechanism, there are problems in that its structure may become complex and its weight may increase improperly and the like.

In the case of constituting the folding mechanism with the above-described wire first and third connecting members 22, 25, however, the split boards 9-11 can be moved to their folding state in accordance with the opening operation of the back door 3 with the lighter and simpler structure. Further, the folding state of the split boards 9-11 and the like can be easily adjusted at the full open of the back door 3 by changing the length of the first through third connecting members 22, 23, 25, the connection portions between these members 22, 23, 25 and the split boards 9-11 or the vehicle body, or the like. Accordingly, the present embodiment is easily and properly applicable to any design of vehicles.

In case the fixed board 8 which is fixed to the vehicle body so as to extend substantially horizontally is provided in front of the movable boards 9-11 of the tonneau board 7 as described above, it can be restrained that the whole weight of the split (movable) boards 9-11 bent by the above-described folding mechanism increases improperly, securing the sufficient whole length of these boards so as to cover the substantially entire part of the rear baggage compartment 5 with the tonneau board 7. Thus, the folding operation of the split boards 9-11 in accordance with the opening operation of the back door 3 can be conducted easily.

Figure 11:
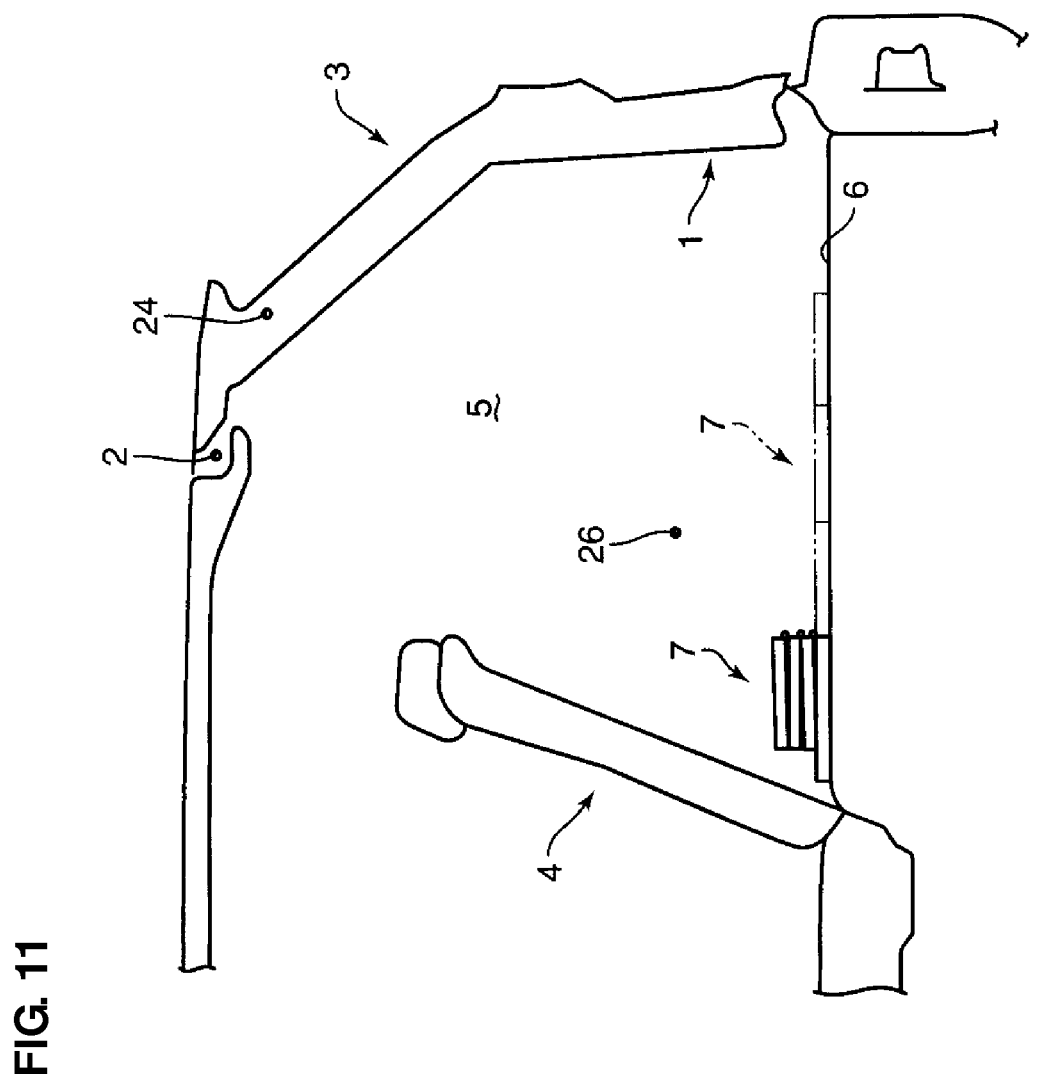
FIG. 11 is an explanatory diagram showing a storage state of the tonneau board, which corresponds to FIG. 1.

Further, in case the split boards 9-11 are configured to have the substantially-equal longitudinal width and they are detachable from the vehicle body by the structure in which the engagement states of the first through third connecting members 22, 23, 25 with the engaging pins 24, 26 are released and the engaging pins 15-17 provided at the fixed board 8 and the front board 9 are removed, as shown in FIG. 11, the split boards 9-11 can be folded with the fixed board 8 and thereby they are stored compactly. Herein, the split boards 9-11 can be also arranged to extend on the floor panel 6 of the rear baggage compartment 5 along with the fixed board 8 as shown by a phantom line in FIG. 11.

Further, the connection portion between the middle board 10 and the rear board 11 is moved substantially horizontally in accordance with the opening of the back door 3 by the forward moving mechanism comprised of the first and third connecting members 22, in the present embodiment. Thereby, when the above-described connection portion is moved forwardly or the like by opening the back door 3 in a state where some article is stored below the tonneau board 7, it can be prevented effectively that the connection portion contacts an upper face of the above-described article and thereby the article hurts.

Moreover, in case the hinge portions 13 which pivotally connect the fixed board 8 and the split boards 9-11 include the basing means 14, such as the torsion coil spring, which biases the split boards 9-11 toward their substantially-horizontal initial state, the fixed board 8 and the split boards 9-11 can be made extend straightly by the biasing force of the biasing means 14 when the back door 3 is moved from its open state to its closing state. Thus, the tonneau board 7 can be arranged so as to extend substantially horizontally over the rear baggage compartment 5 when the back door 3 is closed, without requiring any troublesome operation, such as a manual operation to expand the tonneau board 7.

Embodiment 2

Figure 12:
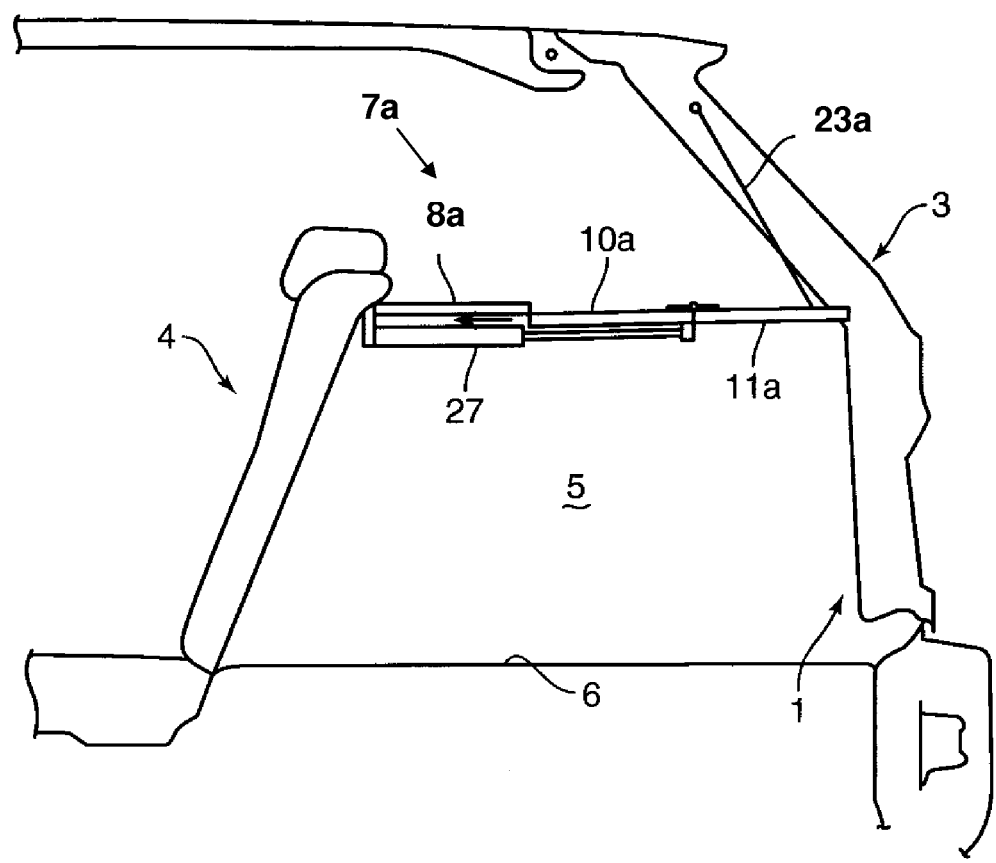
FIG. 12 is an explanatory diagram showing a second embodiment of the tonneau cover device of a vehicle according to the present invention.
Figure 13:
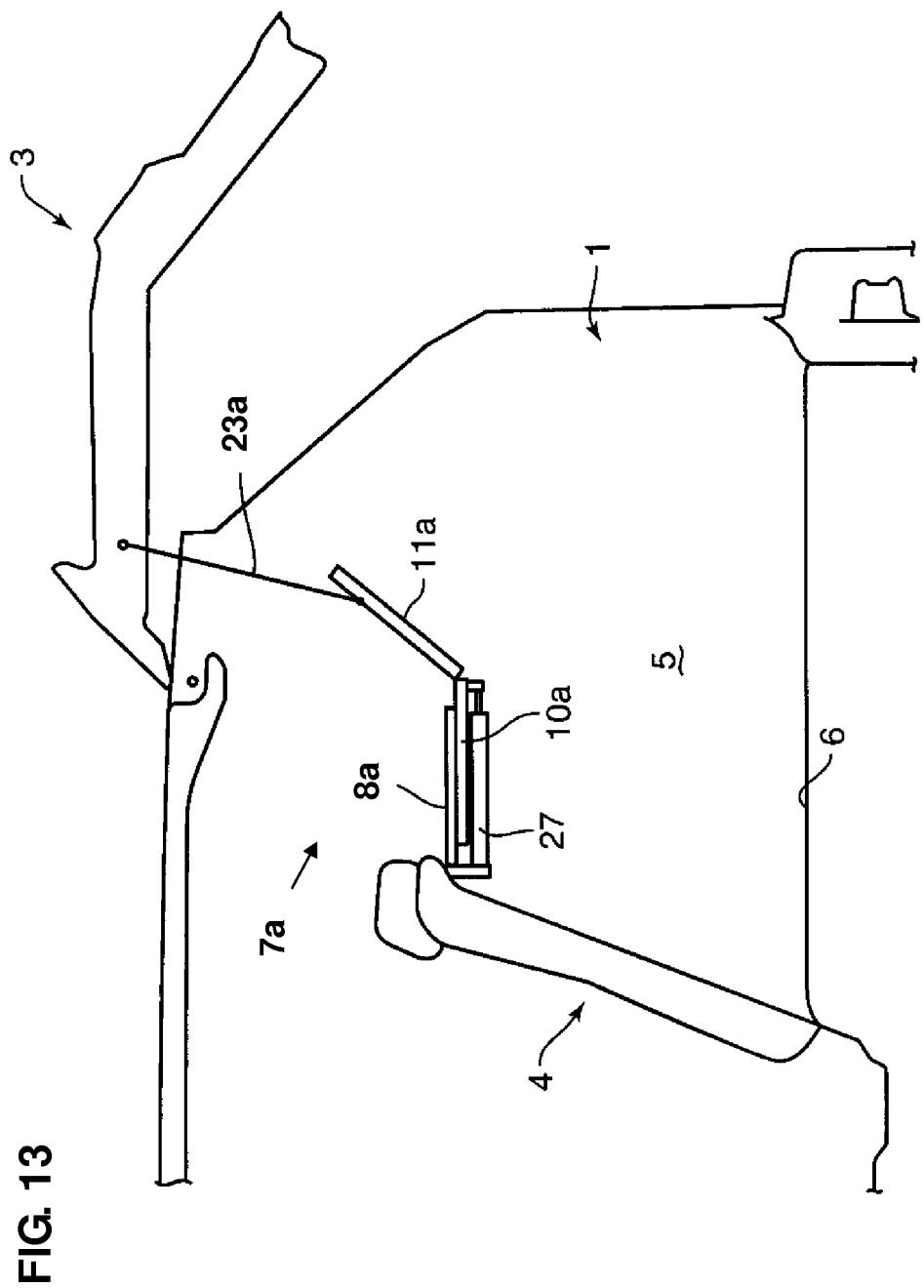
FIG. 13 is a side view showing a state in which the back door is opened.

FIGS. 12 and 13 show a second embodiment of the tonneau cover device of a vehicle.

In the second embodiment, a tonneau board 7a comprises a fixed board 8a, a front board 10a, and a rear board 11a, and the front board 10a and the rear board 11a are coupled to each other via a hinge portion (which is substantially the same as that described in the first embodiment). Herein, a rear end portion of the rear board 11a is connected to the upper portion of the back door 3 via a pair of connecting members 23a, which is similar to the first embodiment. The front board 10a is supported so as to move along a lower face of the fixed board 8a. Further, there is provided an actuator 27 which is comprised of an electric cylinder or the like to move a connection portion of the front board 10a and the rear board 11a forwardly substantially horizontally in accordance with the opening operation of the back door 3.

According to the tonneau cover device of a vehicle of the second embodiment, when the back door 3 is opened, the connecting members 23a pull upwardly the rear end portion of the rear board 11a, and the actuator 27 operates to move the front board 10a forwardly from its initial position. The tonneau cover device of a vehicle of the second embodiment can provide substantially the same functions and operations as the tonneau cover device of a vehicle of the above-described first embodiment. Especially, since the connection portion of the front board 10a and the rear board 11a is moved forwardly substantially horizontally by the actuator 27, it can be prevented effectively that the connection portion contacts an upper face of any article stored in the rear baggage compartment 5 below the tonneau board 7a and thereby the article hurts.

The present intention should not be limited to the above-described embodiments, and any other modifications and improvements may be applied within the scope of a spirit of the present invention.

What is claimed is:

1. A tonneau cover device of a vehicle which includes a rear opening portion formed at a rear portion of a vehicle body, a back door to open and close the rear opening portion, and a rear baggage compartment formed in front of the rear opening portion, comprising:

a tonneau board provided so as to extend substantially horizontally over the rear baggage compartment, the tonneau board including plural split boards which are split in a vehicle longitudinal direction, longitudinally-adjacent split boards being coupled to each other via a hinge portion extending in a vehicle width direction, wherein said split boards include a front board provided on a front side of the vehicle, a rear board provided on the rear side of the vehicle, and a middle board provided between the front board and the rear board, the front board and the middle board are coupled to each other via a first hinge portion, the middle board and the rear board are coupled to each other via a second hinge portion;

a folding mechanism pulling upwardly said front board and said rear board, respectively, when the back door is opened, said folding mechanism comprising a first connection member which connects a rear portion of said middle board to the back door and a second connecting member which connects a rear portion of said rear board to the back door; and a forward move mechanism moving said middle board forwardly when the back door is opened, said forward move mechanism comprising a third connecting member which connects a front portion of said middle board to the vehicle body;

whereby the tonneau board is folded in accordance with an opening operation of the back door such that the front board and the rear board are pulled upwardly by said folding mechanism and the middle board is moved forwardly by said forward moving mechanism, thereby bending the front board and the middle board in a reverse-V shape with respective back faces of the front and middle boards approaching each other and bending the middle board and the rear board in a V shape with respective upper faces of the middle and rear boards approaching each other.

2. The tonneau cover device of a vehicle of claim 1, wherein said folding mechanism pulls upwardly said rear board in advance of said front board.

3. The tonneau cover device of a vehicle of claim 1, wherein said tonneau board further comprises a fixed board fixed to the vehicle body so as to extend substantially horizontally in front of said split boards.

4. The tonneau cover device of a vehicle of claim 1, wherein said split boards have a substantially-equal longitudinal width, and are detachable from the vehicle body.

5. The tonneau cover device of a vehicle of claim 1, wherein said first, second and third connecting members are comprised of a flexible wire, respectively.

* * * * *